US009501587B2

(12) United States Patent
Chen et al.

(10) Patent No.: US 9,501,587 B2
(45) Date of Patent: Nov. 22, 2016

(54) METHOD AND DEVICE FOR PUSHING ASSOCIATION KNOWLEDGE

(71) Applicants: PEKING UNIVERSITY FOUNDER GROUP CO., LTD., Beijing (CN); BEIJING FOUNDER ELECTRONICS CO., LTD., Beijing (CN)

(72) Inventors: Changgang Chen, Beijing (CN); Huarui Bai, Beijing (CN)

(73) Assignees: PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 379 days.

(21) Appl. No.: 14/088,828

(22) Filed: Nov. 25, 2013

(65) Prior Publication Data
US 2014/0214859 A1  Jul. 31, 2014

(30) Foreign Application Priority Data

Jan. 28, 2013 (CN) .......................... 2013 1 0031404

(51) Int. Cl.
G06F 17/30 (2006.01)
(52) U.S. Cl.
CPC ............... G06F 17/30997 (2013.01)
(58) Field of Classification Search
USPC ................... 707/748, 749, 750, 751
See application file for complete search history.

(56) References Cited

U.S. PATENT DOCUMENTS 7,035,871 B2 * 4/2006 Hunt ................. G06F 17/30867
707/802
7,840,568 B2 * 11/2010 Purang .............. G06F 17/30029
707/737
2002/0175935 A1 * 11/2002 Wang ..................... G06Q 30/02
715/738

(Continued)

FOREIGN PATENT DOCUMENTS

CN 102508846 6/2012
CN 102750334 10/2012

(Continued)

OTHER PUBLICATIONS

Chinese Office Action issued in Chinese corresponding application No. 201310031404.2 dated Sep. 1, 2016 (english translation).

Primary Examiner — Mohammad S Rostami
Assistant Examiner — Ahmed Abraham
(74) Attorney, Agent, or Firm — Hamre, Schumann, Mueller & Larson, P.C.

(57) ABSTRACT

The disclosure provides a method for pushing association knowledge, comprising: determining ID information of a user when the user accesses resources; retrieving knowledge having ID information coincident with the ID information of the user in the resources; and pushing knowledge with the highest weight among the retrieved knowledge to the user. The disclosure also provides a device for pushing association knowledge, comprising: an ID module configured to determine ID information of a user when the user accesses resources; a retrieval module configured to retrieve knowledge having ID information coincident with the ID information of the user in the resources; and a pushing module configured to push knowledge with the highest weight among the retrieved knowledge to the user. According to the disclosure, it is able to improve the user experience.

7 Claims, 1 Drawing Sheet

(56) References Cited

U.S. PATENT DOCUMENTS

| | | | |
|---|---|---|---|
| 2005/0222976 A1* | 10/2005 | Pfleger | G06F 17/30646 |
| 2006/0053070 A1* | 3/2006 | Kumazawa | G06F 17/50 |
| | | | 705/28 |
| 2007/0050394 A1* | 3/2007 | Sterling | G06F 17/30292 |
| 2007/0067304 A1* | 3/2007 | Ives | G06Q 30/02 |
| 2008/0243858 A1* | 10/2008 | Dos Remedios | H04L 41/024 |
| 2008/0306916 A1* | 12/2008 | Gonzalez | G06F 17/214 |
| 2009/0037376 A1* | 2/2009 | Archer | G06F 17/30445 |
| 2009/0228500 A1* | 9/2009 | Chong | G06F 17/30327 |
| 2009/0265390 A1* | 10/2009 | Asanuma | G06Q 10/06 |
| 2009/0313133 A1* | 12/2009 | Shimizuta | G06Q 30/08 |
| | | | 705/26.1 |
| 2010/0145927 A1* | 6/2010 | Kasbekar | G06F 17/30867 |
| | | | 707/710 |

FOREIGN PATENT DOCUMENTS

| | | |
|---|---|---|
| CN | 102801878 | 11/2012 |
| CN | 102855480 | 1/2013 |

* cited by examiner

METHOD AND DEVICE FOR PUSHING ASSOCIATION KNOWLEDGE

CROSS-REFERENCE TO RELATED APPLICATIONS

The present application claims priority to Chinese Patent Application No. 201310031404.2 filed before the Chinese Patent Office on Jan. 28, 2013 and entitled "Method and Device for Pushing Association Knowledge", which is incorporated herein by reference in its entirety.

TECHNICAL FIELD

The present application relates to the field of information processing technology, in particular to a method and a device for pushing association knowledge.

BACKGROUND

In order to help a user to find knowledge of interest as soon as possible, an existing book management system or Internet website will, by using a knowledge pushing method, push the relevant knowledge to the user on its own initiative. To achieve this purpose, knowledge association shall be performed in advance. Currently, the knowledge association is mainly performed based on some metadata properties of the content itself, and a large amount of data needs to be processed at the early stage, so the cost is high. When processing the data, many experts need to be hired so as to establish processing standards, and then professionals need to be hired so as to process the data according to the standards. For example, when establishing a periodical & literature database, it not only needs to process the metadata properties of the periodicals, but also needs to structurize the contents, e.g., reference documents, in more depth at the same time. It will take much effort to process the literature.

Apart from the metadata association, the literature may be segmented through a word segmentation technology, and then the knowledge association will be established according to the result of the word segmentation process. Such a method can solve part of the association problem to some extent, but the association result is not accurate enough.

SUMMARY

An object of the present invention is to provide a method and a device for pushing association knowledge, so as to solve the above-mentioned problems.

In one aspect, the present invention provides a method for pushing association knowledge, comprising: determining ID information of a user when the user accesses resources; retrieving knowledge having ID information coincident with the ID information of the user in the resources; and pushing knowledge with the highest weight among the retrieved knowledge to the user.

In another aspect, the present invention further provides a device for pushing association knowledge, comprising: an ID module configured to determine ID information of a user when the user accesses resources; a retrieval module configured to retrieve knowledge having ID information coincident with the ID information of the user in the resources; and a pushing module configured to push knowledge with the highest weight among the retrieved knowledge to the user.

According to the method and device of the present invention, the knowledge is pushed according to the user ID, so it is able to solve the problem of inaccurate association in the prior art, thereby to improve the user experience.

BRIEF DESCRIPTION OF THE DRAWINGS

The drawings, which constitute a part of the present application, are provided so as to facilitate understanding of the present invention, and the illustrative experiments and the descriptions thereof are merely used to explain the present invention, but shall not be considered as limitations thereto. In the drawings.

DETAILED DESCRIPTION

The present invention is described hereinafter in conjunction with the drawings and the embodiments.

Figure 1:
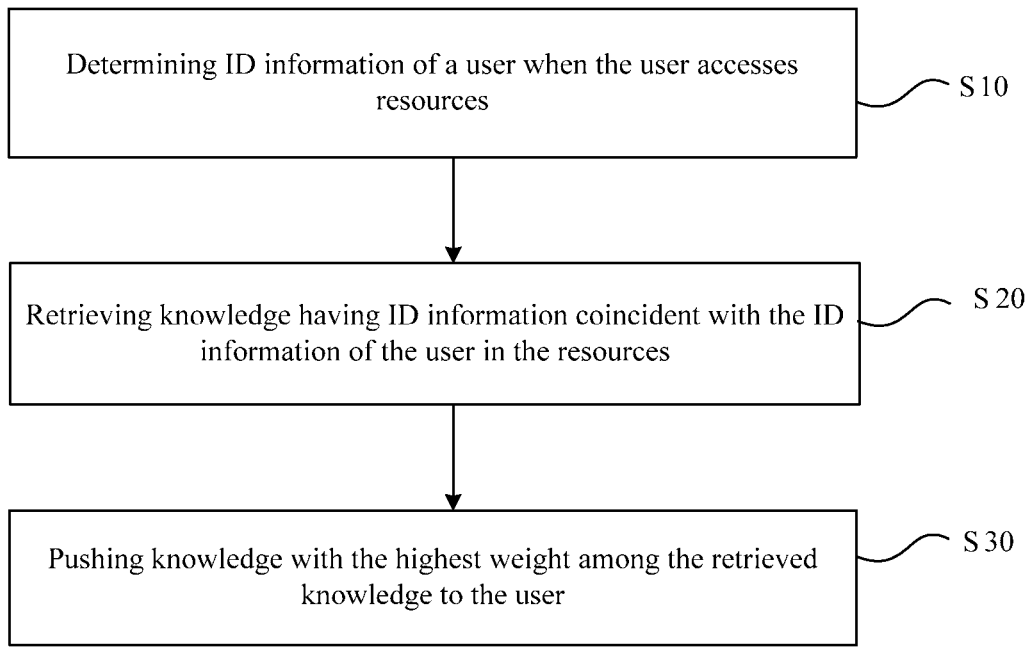
FIG. 1 is a flow chart of a method for pushing association knowledge according to one embodiment of the present invention.

FIG. 1 is a flow chart of a method for pushing association knowledge according to one embodiment of the present invention. As shown in FIG. 1, the method comprises:

Step S10: determining ID information of a user when the user accesses resources;

Step S20: retrieving knowledge having ID information coincident with the ID information of the user in the resources; and Step S30: pushing knowledge with the highest weight among the retrieved knowledge to the user.

In the prior art, the user ID is not taken into consideration during the analysis of the association knowledge, while in the embodiment of the present invention, the knowledge is pushed according to the ID information of the user. As a result, it is able to reinforce the association of the knowledge with the user, increase the hit rate for user expectations, and improve the user experience.

Preferably, the method further comprises: recording ID information and behavior information with respect to the access when the knowledge in the resources is accessed; and setting a weight for the knowledge according to the recorded ID information and behavior information. In a preferred embodiment, the ID information and the behavior information are collected in advance, so as to associate the knowledge with the users and to reflect different behavior types for different users.

Preferably, the step of recording ID information and behavior information with respect to the access comprises: recording an ID of a user accessing the knowledge, the ID being associated with attribute information of pre-registered users and the attribute information including at least one of occupation, institution and education status; recording a behavior type with respect to the access, the behavior type including at least one of browsing, collecting, downloading and purchasing; recording access time; and recording an ID of the accessed knowledge. The inventor, through a lot of experiments, finds that the knowledge in which the user is interested may be best reflected by the attributes such as occupation, institute and education status, and the level of user's interest in the current knowledge may be best reflected by the behaviors such as browsing, collecting, downloading and purchasing. In a preferred embodiment, the occupation, institution and education status are used as the ID information, and the behaviors such as browsing, collecting, downloading and purchasing are used as the behavior information. As a result, better knowledge association will be achieved.

Following is a table of a record according to a preferred embodiment of the present invention.

| Field | Field type | Field description |
|---|---|---|
| OP_ID | number | Primary key |
| OP_TYPE | varchar | Behavior type |
| OP_DATE | date | Time |
| OP_USERID | number | User ID |
| OP_RESOURCEID | number | Knowledge ID |

A database may be used to manage the above record, wherein OP_ID represents a primary key of the record in the database.

Preferably, the step of setting a weight for the knowledge according to the recorded ID information and behavior information comprises: setting $W_j=f(a, t)$, wherein all the knowledge is traversed with the ID of the knowledge, and wherein j represents the type of the attribute information of the currently traversed knowledge associated with the user ID, $W_j$ represents the weight of the currently traversed knowledge relative to j, a represents the weight of the behavior type of the currently traversed knowledge and each behavior type has a corresponding weight, t represents the access time for the currently traversed knowledge, and f(a, t) represents a summation operation, wherein the closer the access time, the larger the weight a.

The weight set according to the recorded ID information and the behavior information may be recorded in the following table.

| Field | Field type | Field description |
|---|---|---|
| OP_RESOURCEID | NUMBER | Knowledge ID |
| WEIGHT | NUMBER | Knowledge weight $W_j$ |
| TYPE | VARCHAR | J |

Preferably, $f(a, t) = a_{browse}*l + a_{collect}*n + a_{download}*x + a_{purchase}*y$, wherein l, n, x and y represent the times of browsing, collecting, downloading and purchasing within the time t respectively, $a_{browse}$ represents the weight for the browsing behavior, $a_{collect}$ represents the weight for the collecting behavior, $a_{download}$ represents the weight for the downloading behavior, and $a_{purchase}$ represents the weight for the purchasing behavior. This expression is simple and can be realized programmatically.

Preferably, $$f(a, t) = \sum_{i=1}^{i=m} ((\alpha_{browse} \times 1_i + \alpha_{collect} \times n_i + \alpha_{browse} \times x_i + \alpha_{purchase} \times y_i) \times p^{m-i}),$$

wherein $l_i$, $n_i$, $x_i$ and $y_i$ represent the times of browsing, collecting, downloading and purchasing within a period i included in the time t respectively, i represents a serial number of the period (the current period i has a value of m, the longer the time, the smaller the period i, and the period i has the smallest value of 1), p represents a time decay parameter and is set as a decimal less than 1 and greater than 0, $a_{browse}$ represents the weight for the browsing behavior, $a_{collect}$ represents the weight for the collecting behavior, $a_{download}$ represents the weight for the downloading behavior, and $a_{purchase}$ represents the weight for the purchasing behavior. This expression is simple and can be realized programmatically. In this preferred embodiment, the time decay is also taken into account. For example, t is set as one year on a monthly basis, then m=12. Because p is a decimal less than 1 and greater than 0, the weight due to the access 10 months ago will be multiplied by $p^{10}$, and the weight due to the access in the current month will be multiplied by 1, i.e., there is no time decay.

Also, the time t may be set as two years on a weekly basis. These two values may be adjusted.

Preferably, $a_{browse} \leq a_{collect} \leq a_{download} \leq a_{purchase}$. The inventor, through a lot of experiments, finds that the user's interest is highest in purchasing, then in collecting and downloading, and lowest in browsing. Therefore, such a relationship between the weights is set so as to hit the knowledge of interest in a better manner.

Preferably, $a_{browse}:a_{collect}:a_{download}:a_{purchase}=1:2:2:5$, and p=0.9. These values are the optimal ones acquired by the inventor through a lot of experiments.

Preferably, Step S20 comprises acquiring attribute information associated with the user ID, determining the value of j as q according to the attribute information, and retrieving the knowledge whose weight $W_q$ is not zero or a null value in the resources.

Preferably, the step of pushing knowledge with the highest weight among the retrieved knowledge to the user comprises ranking $W_q$, and pushing the first N pieces of knowledge with the highest $W_q$ to the user, wherein N is a predetermined number.

For example, the user who is a doctor with a master degree or above and works in a hospital is defined as a first kind, i.e., j=1, and the user who is students with a bachelor degree or above and works in a hospital is defined as a second kind, i.e., j=2. If the users of the first and second kinds have ever accessed the knowledge with a knowledge ID=10000, the weights $W_1$ and $W_2$ will be set for the knowledge respectively. When a user accesses the knowledge with the knowledge ID=10000, the type of the current user will be determined at first, e.g., the user belongs to the first kind. Then, the knowledge whose weight W1 is not zero or a null value will be retrieved, and the first N (e.g., N=5) pieces of knowledge with the highest $W_1$ will be pushed to the user.

If the number of pieces of the retrieved knowledge is greater than N, N pieces of the knowledge may be extracted randomly from the retrieved knowledge. For example, if at most 10 pieces of the knowledge will be displayed by default, 10 pieces of the knowledge will be selected randomly from 50 pieces of the knowledge with the highest weight.

The contents to be recommended may be displayed in an XML format, and a terminal may display the contents in a final page using a corresponding template according to the practical need.

Figure 2:
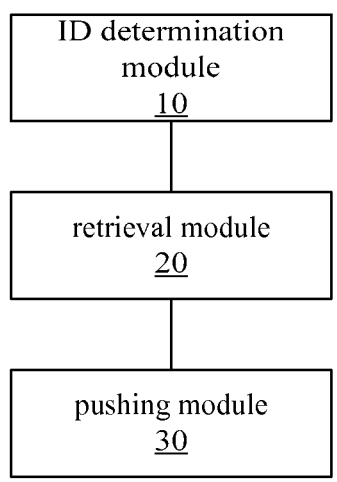
FIG. 2 is a schematic view showing a device for pushing association knowledge according to one embodiment of the present invention.

FIG. 2 is a schematic view showing a device for pushing association knowledge according to one embodiment of the present application. The device comprises:

an ID determination module 10 configured to determine ID information of a user when the user accesses resources;

a retrieval module 20 configured to retrieve knowledge having ID information coincident with the ID information of the user in the resources; and a pushing module 30 configured to push knowledge with the highest weight among the retrieved knowledge to the user.

According to the device of the present invention, it is able to improve the user experience.

Preferably, the device further comprises: a recording module configured to record ID information and behavior information with respect to the access when the knowledge in the resources is accessed, and a weighting module configured to set a weight for the knowledge according to the recorded ID information and behavior information.

According to the method and device of the present invention, it is able to automatically establish dynamic knowledge association, so as to reduce the cost of manual maintenance, push to the user the knowledge that is most likely to be required by the user, and reduce the difficulty in searching for the knowledge for the user.

Obviously, it should be appreciated that, the modules or steps of the present invention may be implemented via general calculation means, e.g., a single calculation means or a network consisting of several calculation means. Alternatively, they may be implemented via program codes that can be executed by the calculation means. Hence, the program codes may be stored in a storage means and executed by the calculation means, or may be implemented by manufacturing them into several IC modules respectively or by manufacturing some of them into a signal IC module. As a result, the present invention is not limited to any specific combination of hardware and software.

The above are merely the preferred embodiments of the present invention, and these embodiments shall not be construed as limiting the present invention. It should be noted that, a person skilled in the art may further make improvements and modifications without departing from the principle of the present invention, and these improvements and modifications shall also be fallen into the scope of the present invention.

What is claimed is:

1. A method for pushing association knowledge, comprising:
   determining ID information of a user when the user accesses resources;
   retrieving knowledge having ID information coincident with the ID information of the user in the resources;
   pushing, to the user, knowledge with a highest weight among the knowledge having ID information coincident with the ID information of the user in the resources;
   recording ID information and behavior information with respect to an access when knowledge in the resources is accessed; and
   setting a weight for the knowledge according to the ID information and behavior information recorded,
   wherein setting the weight for the knowledge according to the ID information and behavior information recorded includes:
   setting Wj=f(a, t), wherein the knowledge is traversed with the ID information of the knowledge, wherein:
   j represents a type of attribute information of a currently traversed knowledge associated with a user ID,
   Wj represents the weight of the currently traversed knowledge relative to j,
   a represents a weight of the behavior type of the currently traversed knowledge, each behavior type having a corresponding weight,
   t represents an access time for the currently traversed knowledge, and f(a, t) represents a summation operation, wherein a closer the access time, a larger the weight a;
wherein:

$$f(a,t) = a_{browse}*l + a_{collect}*n + a_{download}*x + a_{purchase}*y,$$
wherein:

l, n, x, and y represent times of browsing, collecting, downloading, and purchasing within the access time t respectively, or $$f(a, t) = \sum_{i=1}^{i=m} ((\alpha_{browse} \times 1_i + \alpha_{collect} \times n_i + \alpha_{browse} \times x_i + \alpha_{purchase} \times y_i) \times p^{m-i}),$$

wherein:
li, ni, xi, and yi represent times of browsing, collecting, downloading, and purchasing within a period i included in the access time t respectively,
i represents a serial number of a period, a current period i has a value of m, a longer the access time, a smaller the period i, the period i has a smallest value of 1,
p represents a time decay parameter and is set as a decimal less than 1 and greater than 0,
$a_{browse}$ represents a weight for the browsing behavior,
$a_{collect}$ represents a weight for the collecting behavior,
$a_{download}$ represents a weight for the downloading behavior, and
$a_{purchase}$ represents a weight for the purchasing behavior;
wherein retrieving knowledge having ID information coincident with the ID information of the user in the resources comprises:
acquiring attribute information associated with the user ID;
determining the value of j as q according to the attribute information; and
retrieving the knowledge whose weight Wq is not zero or whose weight Wq is not a null value in the resources; and
wherein pushing knowledge with the highest weight among the retrieved knowledge to the user comprises:
ranking Wq; and
pushing a first N pieces of knowledge with the highest Wq to the user, wherein N is a predetermined number.

2. The method according to claim 1, wherein recording ID information and behavior information with respect to the access comprises:
   recording an ID of a user accessing the knowledge, the ID being associated with attribute information of pre-registered users and the attribute information including at least one of occupation, institution, and education status;
   recording a behavior type with respect to the access, the behavior type including at least one of browsing, collecting, downloading, and purchasing;
   recording the access time; and
   recording an ID of the accessed knowledge.

3. The method according to claim 1, wherein $a_{browse} \leq a_{collect} \leq a_{download} \leq a_{purchase}$.

4. The method according to claim 3, wherein $a_{browse} \leq a_{collect} \leq a_{download}$ $a_{purchase}$=1:2:2:5, and p=0.9.

5. A device for pushing association knowledge, comprising:
   an ID determination module that determines ID information of a user when the user accesses resources;

a retrieval module that retrieves knowledge having ID information coincident with the ID information of the user in the resources;

a pushing module that pushes, to the user, knowledge with a highest weight among the knowledge having ID information coincident with the ID information of the user in the resources;

a recording module that records ID information and behavior information with respect to an access when knowledge in the resources is accessed; and a setting module that sets a weight for the knowledge according to the ID information and behavior information recorded by the recording module, wherein the setting module sets Wj=f(a, t), wherein the knowledge is traversed with the ID information of the knowledge, wherein:

j represents a type of attribute information of a currently traversed knowledge associated with a user ID, Wj represents the weight of the currently traversed knowledge relative to j, a represents a weight of the behavior type of the currently traversed knowledge, each behavior type having a corresponding weight, t represents an access time for the currently traversed knowledge, and f(a, t) represents a summation operation, wherein a closer the access time, a larger the weight a;

wherein:

$$f(a,t)=a_{browse}*l+a_{collect}*n+a_{download}*x+a_{purchase}*y,$$
wherein:

l, n, x, and y represent times of browsing, collecting, downloading, and purchasing within the access time t respectively, or $$f(a, t) = \sum_{i=1}^{i=m}((\alpha_{browse} \times 1_i + \alpha_{collect} \times n_i + \alpha_{browse} \times x_i + \alpha_{purchase} \times y_i) \times p^{m-i}),$$

wherein:

li, ni, xi, and yi represent times of browsing, collecting, downloading, and purchasing within a period i included in the access time t respectively, i represents a serial number of a period, a current period i has a value of m, a longer the access time, a smaller the period i, the period i has a smallest value of 1, p represents a time decay parameter and is set as a decimal less than 1 and greater than 0, $a_{browse}$ represents a weight for the browsing behavior, $a_{collect}$ represents a weight for the collecting behavior, $a_{download}$ represents a weight for the downloading behavior, and $a_{purchase}$ represents a weight for the purchasing behavior;

wherein retrieving knowledge having ID information coincident with the ID information of the user in the resources comprises:

acquiring attribute information associated with the user ID;

determining the value of j as q according to the attribute information; and retrieving the knowledge whose weight Wq is not zero or whose weight Wq is not a null value in the resources; and wherein pushing knowledge with the highest weight among the retrieved knowledge to the user comprises:

ranking Wq; and pushing a first N pieces of knowledge with the highest Wq to the user, wherein N is a predetermined number.

6. A computer program product embodied on a non-transitory computer readable medium, comprising computer code for implementing the method according to claim 1.

7. A non-transitory computer readable medium configured to store the computer program product according to claim 6.

* * * * *